(12) United States Patent
Campagnolo

(10) Patent No.: US 6,350,212 B1
(45) Date of Patent: Feb. 26, 2002

(54) REAR DERAILLEUR OF A BICYCLE

(75) Inventor: Valentino Campagnolo, Vicenza (IT)

(73) Assignee: Campagnolo Srl, Vicenza (IT)

( * ) Notice: Subject to any disclaimer, the term of this patent is extended or adjusted under 35 U.S.C. 154(b) by 0 days.

(21) Appl. No.: 09/526,058

(22) Filed: Mar. 15, 2000

(30) Foreign Application Priority Data

Apr. 13, 1999 (IT) .......................... TO99A0283

(51) Int. Cl.$^7$ .............................................. F16H 59/00
(52) U.S. Cl. .......................................... 474/80; 474/82
(58) Field of Search ............................ 474/80, 82, 78, 474/77, 79, 81

(56) References Cited

U.S. PATENT DOCUMENTS

| | | | |
|---|---|---|---|
| 4,627,827 A | * 12/1986 | Juy | 474/82 X |
| 4,690,663 A | * 9/1987 | Nagano | 474/80 |
| 4,692,131 A | * 9/1987 | Nagano | 474/80 |
| 4,850,940 A | * 7/1989 | Nagano | 474/80 |
| 5,498,211 A | * 3/1996 | Hsu | 474/80 |
| 5,624,335 A | * 4/1997 | Ando | 474/80 |
| 5,836,844 A | * 11/1998 | Yoshida | 474/80 |

* cited by examiner

Primary Examiner—David A. Bucci
Assistant Examiner—Marcus Charles
(74) Attorney, Agent, or Firm—Sughrue Mion, PLLC

(57) ABSTRACT

A rear derailleur of a bicycle comprises a first body mounted rotatable on a first articulating pin intended to be fixed to the bicycle frame and a second body connected to the first body by an articulated parallelogram system and carrying a second articulating pin on which a rocking arm for transmission of the bicycle chain is mounted so that it can rotate. The two articulating pins are associated with first and second elastic elements tending to bring back the first body and the rocking arm respectively to a stop position. A device is provided for adjusting the tension of the second elastic element, by acting on the end of the said second elastic element connected to the rocking arm, which make it possible to alter the equilibrium of forces to which the derailleur is subjected and in consequence also cause a rotation of the first body about the first articulating pin.

3 Claims, 5 Drawing Sheets

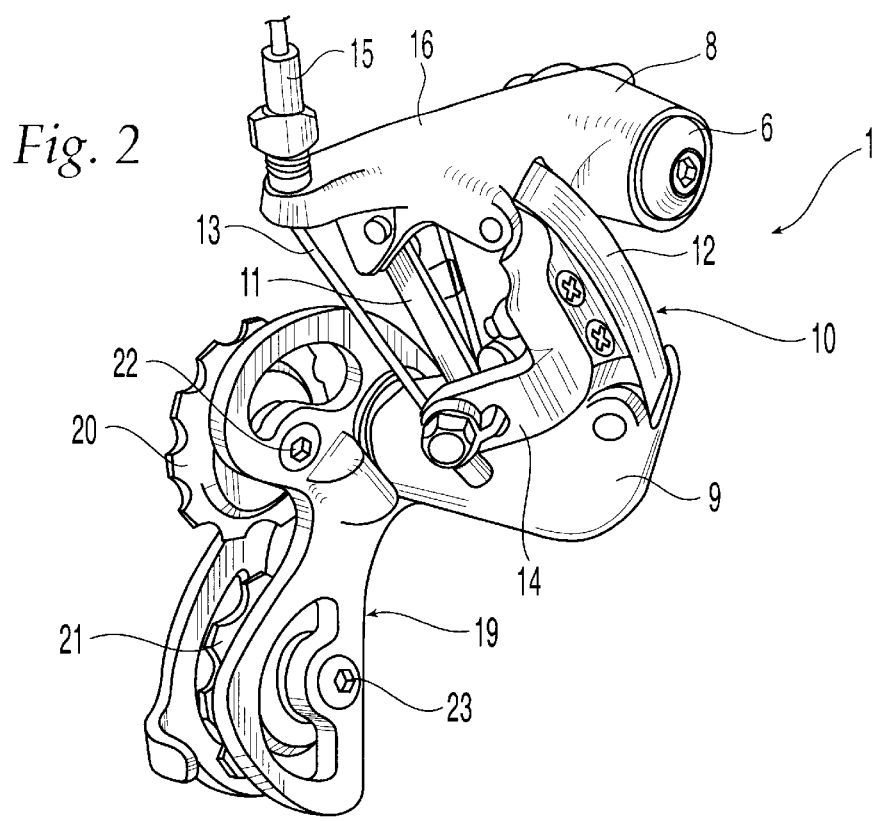
*Fig. 2*
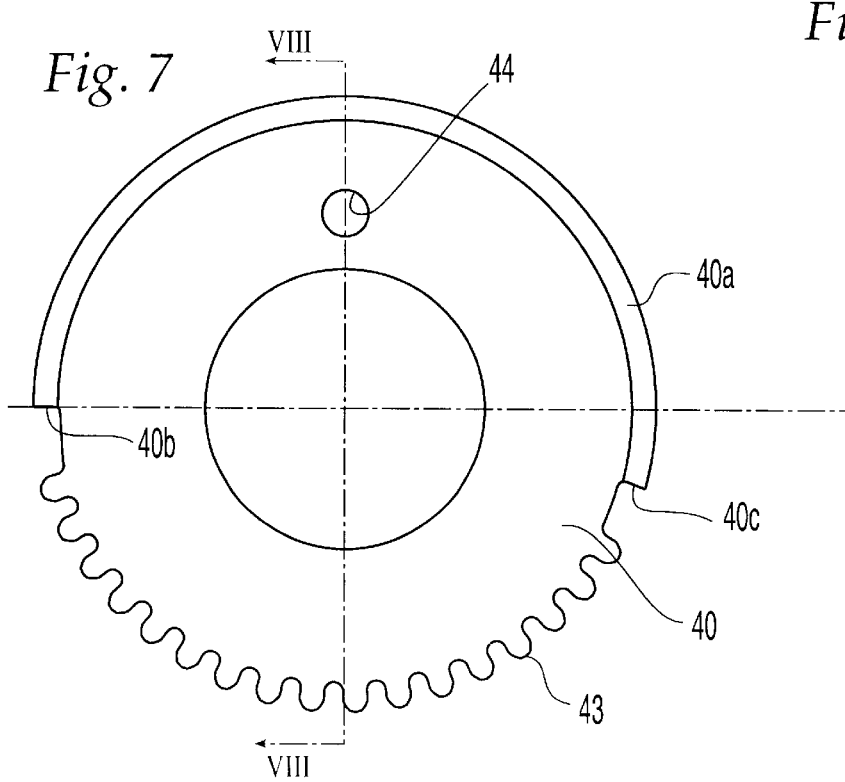
*Fig. 7*
*Fig. 8*

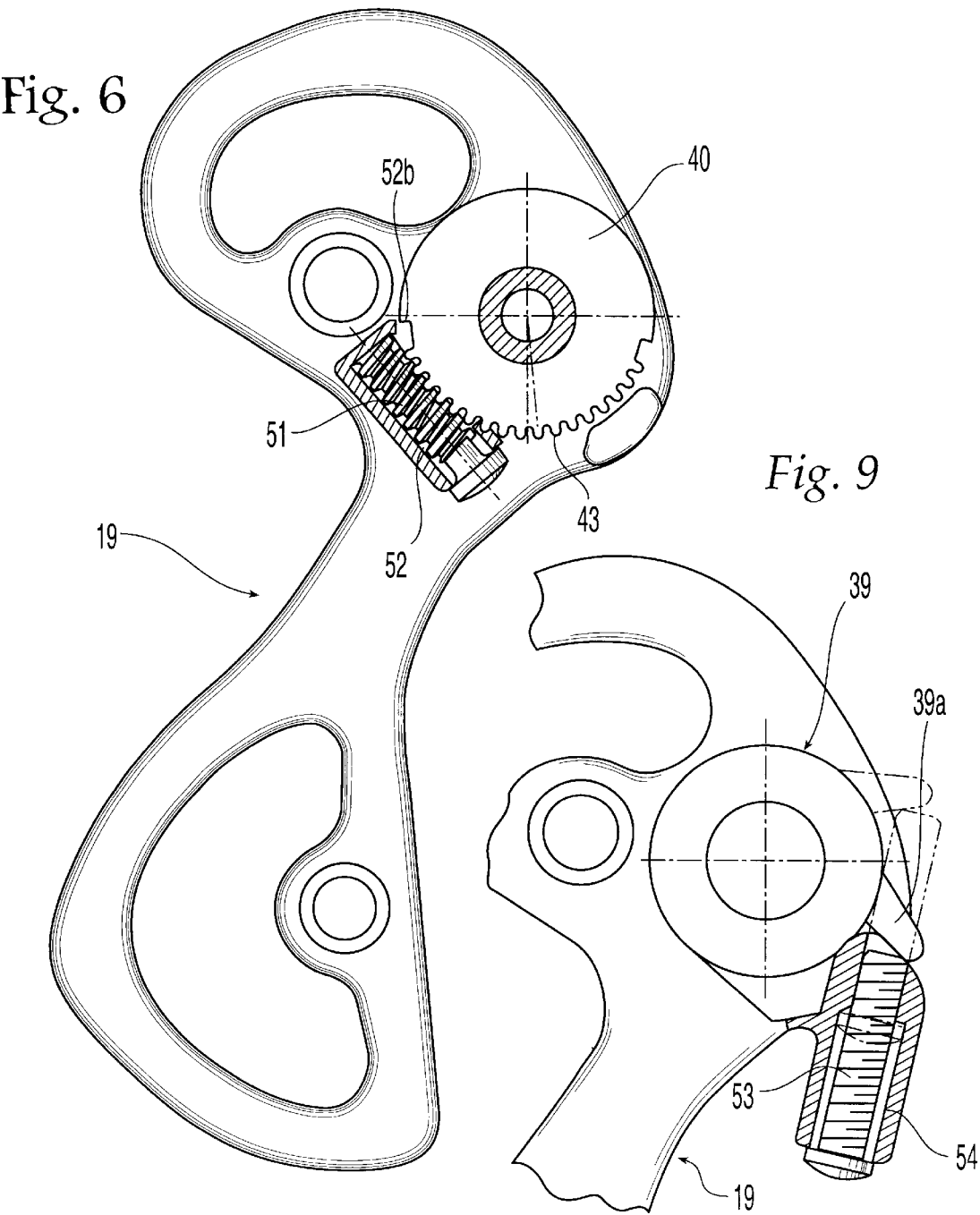

REAR DERAILLEUR OF A BICYCLE

BACKGROUND OF THE INVENTION

The present invention relates to a rear derailleur for a bicycle, intended for controlling the selective engagement of a bicycle chain on a series of coaxial pinions associated with the rear wheel of the bicycle. In particular, the invention relates to rear derailleurs of the type comprising:

- a first articulating pin intended to be fixed to the bicycle frame with its axis substantially parallel to the axis of the pinions,
- a first body mounted so that it is rotatable on the said first articulating pin,
- first elastic means associated with the said first body tending to rotate the latter about the said first pin relative to the bicycle frame, with reference to the state when the derailleur is mounted on the frame, to an end-of-travel (stop) position,
- a second body connected to the first body so as to be movable relative to the first body at least in a direction parallel to the axis of the pinions, the position of the said second body being controlled by means for controlling the derailleur,
- a second articulating pin carried by the aforementioned second body and substantially parallel to the said first pin,
- a rocking arm carrying rollers for transmission of the chain, rotatable on the said second pin, and
- second elastic means interposed operatively between the aforementioned second body and the rocking arm, tending to rotate the latter about the said second pin to a stop position, in such a way that, in the condition with the derailleur mounted on the bicycle, with the bicycle chain engaged with the rocking arm, the derailleur assumes an arrangement that depends on the equilibrium between the forces to which the derailleur is subjected, i.e. mainly the reaction of the chain on the rocking arm, the tension of the first elastic means and the tension of the second elastic means.

Derailleurs possessing the characteristics indicated above have been known and used for some time. A derailleur of this type is for example described and illustrated in French patent No. 1,258,146 (Juy), granted on Feb. 27, 1961. The same applicant has been manufacturing and marketing, at least since 1974, rear derailleurs for bicycles possessing the characteristics stated above, in which the first and second elastic means are two helical springs. In particular, in the derailleur that has been manufactured and marketed by the applicant since 1974 with the "Rally" trademark, the aforesaid first spring of the derailleur was interposed between the aforesaid first body and a stop washer, mounted on the aforesaid first articulating pin and provided with a tab capable of coming to rest against a stop-surface provided on the bicycle frame, in such a way that, with the derailleur mounted on the frame, the first spring was then interposed operatively between the first body of the derailleur and the bicycle frame.

U.S. Pat. No. 3,364,763 (Juy), published on Jan. 23, 1968, illustrates a derailleur of the type indicated above, in which the tension of the first spring can be adjusted by fitting one end of the spring in a hole selected between two holes provided on the first body.

U.S. Pat. No. 4,690,663 (Nagano), published on Jan. 9, 1987, also achieves adjustment of the tension of the first spring, but in this case rapidly (without requiring dismantling as in Juy) by adjusting the position of the stop-washer, which is provided with an adjusting screw that reacts against the bicycle frame, according to well-known technology (cf. U.S. Pat. No. 4,235,118).

All the solutions previously proposed, however, are not entirely satisfactory in as much as they involve limited angular ranges of adjustment and/or relatively long adjustment times. Moreover, the solution in U.S. Pat. No. 4,690,663 cannot always be used, as in some cases the bicycle frame is configured in a way that does not permit the use of the aforesaid adjusting screw. Finally, the use of the said screw is not completely reliable, since the screw itself operates independently in certain circumstances.

SUMMARY OF THE INVENTION

The aim of the present invention is to devise a rear derailleur for a bicycle of the type stated at the beginning, that is free from the aforementioned shortcomings and which, in particular, permits quick and simple adjustment of the configuration of the derailleur, with means that have an extremely simple structure that requires little space, and are such as to offer a relatively wide range of adjustment.

For achieving this aim, the object of the invention is a rear derailleur for a bicycle of the type indicated at the beginning of the present description, characterized in that means are provided for quick adjustment of only the aforesaid second elastic means, the said first elastic means being instead without means for quick adjustment.

The term "means for quick adjustment" is intended to indicate any device capable of adjusting the elastic means without requiring the dismantling of parts, as is the case for example in solutions that envisage the possibility of fitting one end of a spring in any one hole of a series of holes provided in the respective connecting element.

According to the invention, the aforesaid means of adjustment are arranged to permit quick adjustment of the tension of the second elastic means interposed between the second body of the derailleur and the rocking arm. On changing the tension of the second elastic means, the system of forces to which the derailleur is subject is altered, so that the derailleur changes its configuration. In general this means that there is a change both in the angular position of the first body of the derailleur about the first axis of articulation relative to the bicycle frame, and in the angular position of the rocking arm.

In the preferred embodiment of the invention, the second elastic means consist of a helical spring, arranged around the said second pin and with one end connected rigidly to the said second body, the opposite end being connected rigidly to an adjusting device carried by the rocking arm, means being provided for adjustment of the angular position of the said adjusting device relative to the rocking arm about the axis of the second pin.

Preferably, the adjusting device comprises a disk with rotatable mounting on the rocking arm about the axis of the second pin and equipped with a toothed sector in engagement with a tangential adjusting worm gear that also has a rotatable mounting in the structure of the rocking arm. Owing to this arrangement, the adjusting device takes up much less space and does not involve substantial modifications relative to the structure of a conventional derailleur. Moreover, the use of a worm gear-toothed wheel connection makes it possible to obtain a relatively wide angular range of adjustment and to obtain adjustment over the whole range in a relatively short time.

The derailleur according to the invention envisages quick adjustment only of the second elastic means, i.e. it is without means for quick adjustment of the tension of the first elastic means, so as to avoid the shortcomings of the known technology described above.

BRIEF DESCRIPTION OF THE DRAWINGS

Further characteristics and advantages of the invention will become clear from the description that follows, with reference to the appended drawings, supplied purely as a non-limitative example, in which:

FIG. 2 is an enlarged perspective view of the derailleur in FIG. 1, FIG. 6 is a front view of the rocking arm that is a component part of the derailleur according to the invention, provided with means for adjusting the tension of the second elastic means, FIG. 7 is a front view of a detail in FIG. 6, FIG. 8 is a sectional view along line VIII—VIII in FIG. 7, and FIG. 9 shows a variant of FIG. 6.

DETAILED DESCRIPTION OF THE INVENTION

Figure 1:
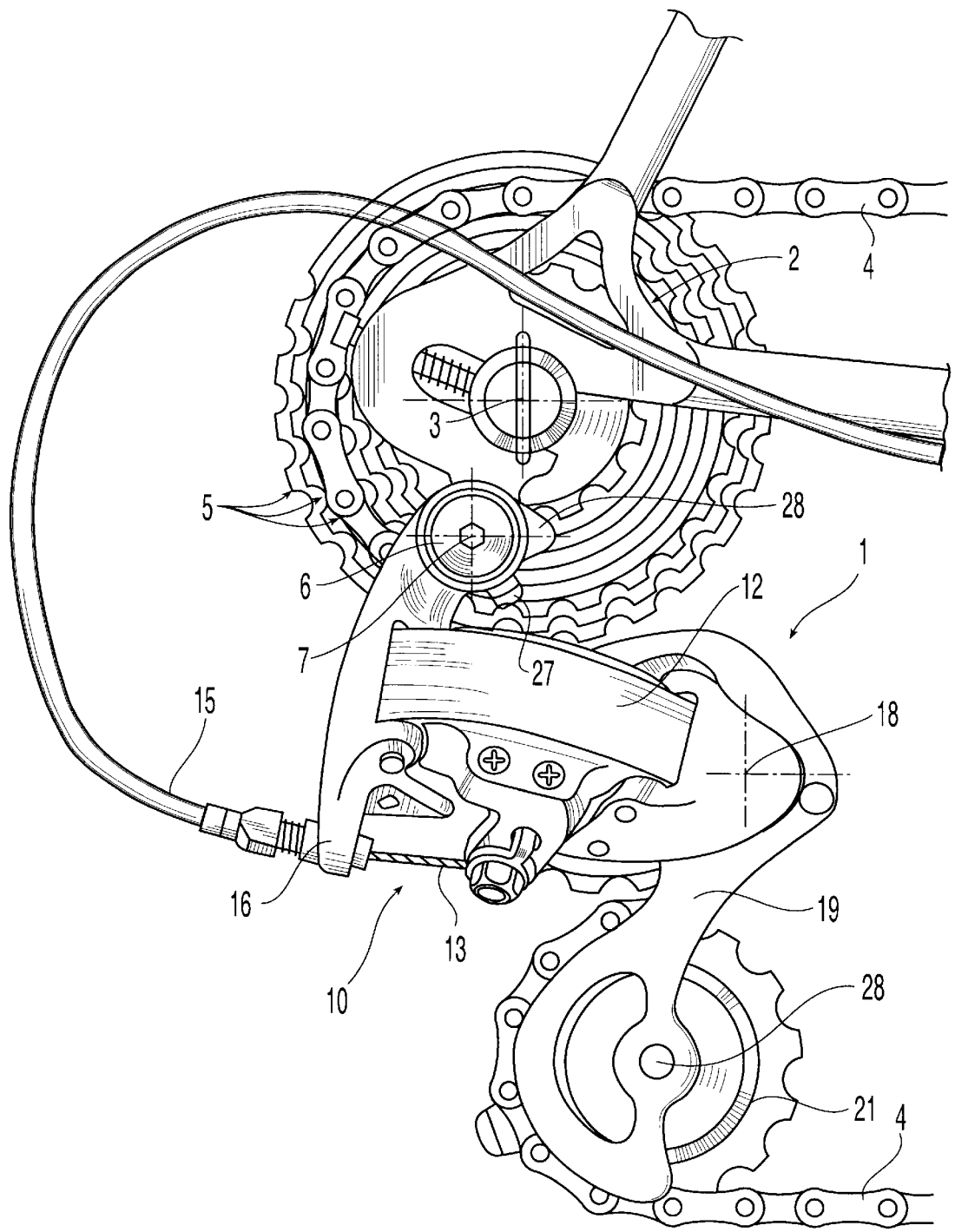
FIG. 1 is a view of one embodiment of the derailleur according to the invention, as mounted on a bicycle frame.

Referring to the drawings, number 1 indicates the whole of a rear derailleur of a bicycle according to the present invention. Referring in particular to FIG. 1, the derailleur 1 is intended to be mounted on the frame 2 of a bicycle, adjacent to the axis 3 of the rear wheel, to control the selective engagement of a drive chain 4 on a series of pinions 5 of different diameters, associated with the rear wheel of the bicycle and with a common axis coinciding with axis 3.

Figure 3:
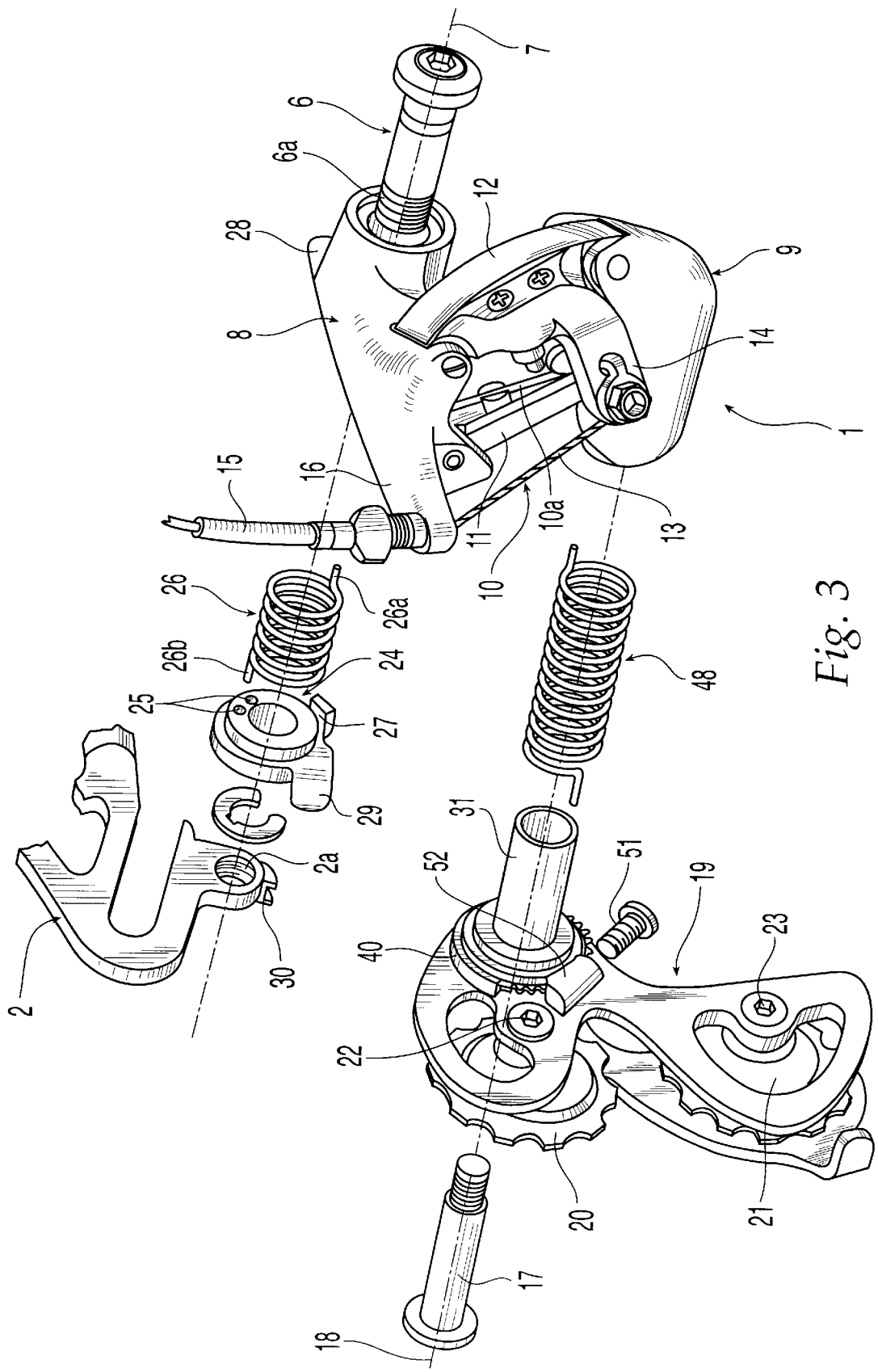
FIG. 3 is an exploded perspective view of the derailleur in FIG. 1.

Now referring in particular to FIG. 3, the derailleur 1 comprises, in a known manner, a first articulating pin 6 possessing a threaded end 6a which is received and locked in a threaded hole 2a of bicycle frame 2 in such a way that pin 6 is rigidly connected to the frame with its axis 7 directed parallel to the common axis 3 of pinions 5.

Still according to the conventional technology, the derailleur comprises a first body 8 that is rotatable on the first articulating pin 6 and a second body 9 that is connected to the first body 8 in such a way as to be movable in a direction that has a predominant component parallel to axis 7. More precisely, still according to the conventional technology, the second body 9 is connected to the first body 8 by means of a hinged parallelogram system 10 comprising a pair of arms 11, 12 whose ends are hinged to the first body 8 and to the second body 9. Still according to the conventional technology, the hinged parallelogram system 10 is combined with a spring 10a which tends to maintain body 9 in an end position corresponding to engagement of the chain with the pinion with smallest diameter. Body 9 can be moved from that position, against the action of spring 10a, by controlling means of a conventional type, including a flexible cable 13 connected to a branch 14 of arm 12 and associated with a sheath 15 connected to an extension 16 of first body 8.

A second articulating pin 17 with axis 18 parallel to axis 7 of the first articulating pin 6 is connected rigidly to the second body 9. A rocking arm 19 carrying a pair of rollers 20, 21 that are free to rotate about axes 22, 23 parallel to axis 17, for transmission of chain 4, has articulated support on the second pin 17, as can be seen in FIG. 1.

A washer 24, which has a pair of holes 25, is mounted free to rotate on the first articulating pin 6. The first body 8 has a cylindrical cavity through which the first articulating pin 6 passes, and which also receives a first helical spring 26 arranged around pin 6. Spring 26 has an end tang 26a secured to body 8, and an opposite tang 26b which is received in one of the two holes 25, depending on the degree of tension that is to be given to spring 26. When the derailleur is not mounted on frame 2, spring 26 holds washer 24 in a stop position defined by engagement of one of its tabs 27 against a corresponding tab 28 of body 8. When the derailleur is mounted on frame 2, by screwing pin 6 in hole 2a, another tab 29 of washer 24 comes up against a stop surface 30 of the frame, in such a way that washer 24 is held in a rotated position relative to the stop position mentioned above, in which tab 27 is kept at a distance from tab 28 and spring 26 is tensioned further. In this condition, spring 26 tends to make body 8 rotate clockwise relative to frame 2 (referring to FIGS. 1–3).

In contrast to what is envisaged in some solutions according to the prior art (see for example U.S. Pat. No. 4,235,118 and U.S. Pat. No. 4,690,663), tab 29 of washer 24 is not provided with any adjusting screw capable of altering the distance between tab 29 and the stop surface 30, with the aim of altering the tension of spring 26.

Figure 4:
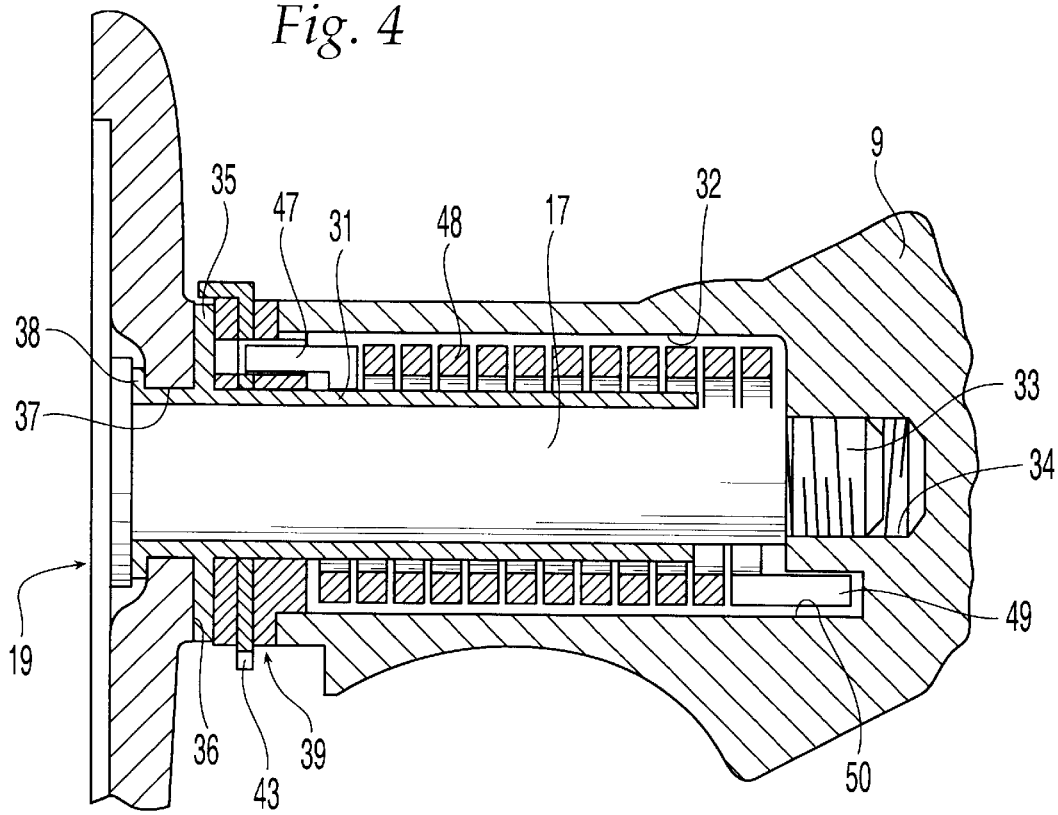
FIG. 4 is a sectional view along line IV–IV in FIG. 1.

Referring again to FIGS. 3 and 4, rocking arm 19 has rotatable mounting on the second articulating pin 17 with an interposed bushing 31. Referring to FIG. 4 in particular, pin 17 is received in a cylindrical cavity 32 of the second body 9 and has an end portion 33 screwed into a corresponding threaded blind hole 34 made starting from the bottom surface of cylindrical cavity 32. Bushing 31, of metallic material, has a flange 35 that is up against a front surface 36 of the structure of rocking arm 19 and in addition extends through a through-hole 37 made in rocking arm 19. Bushing 31 is secured to rocking arm 19 by riveting of the end 38 of bushing 31 on the surface of rocking arm 19 situated on the opposite side relative to surface 36.

Figure 5:
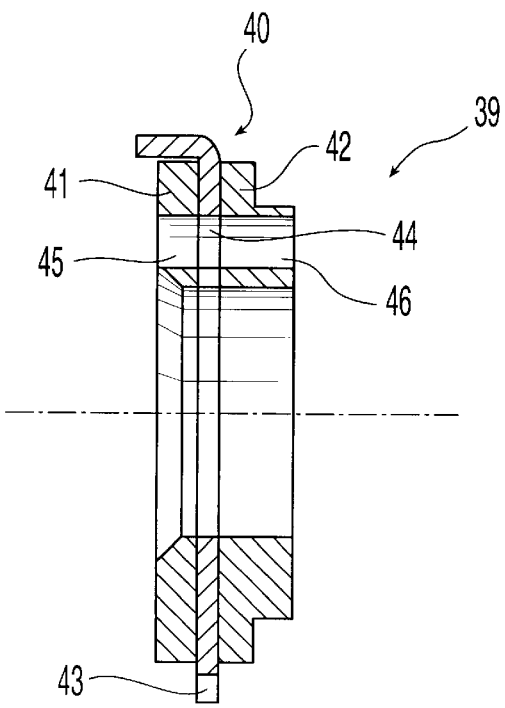
FIG. 5 is a sectional view of a detail in FIG. 4, on an enlarged scale.

According to the invention, a disk 39 is mounted rotatable on bushing 31, as is clearly shown in FIG. 5. In the example shown, disk 39 consists of a flat ring of sheet metal 40, which can also be seen in FIGS. 7 and 8, held between two rings 41, 42. Also referring to FIGS. 7 and 8, the flat disk of sheet metal 40 has a toothed sector 43 and a through-hole 44 aligned with holes 45, 46 of the two rings 41, 42 so as to define a single hole for receiving an end tang 47 of a helical spring 48 which is positioned in cavity 32 (see FIG. 4) and whose opposite end forms a tang 49 secured in a seating 50 of body 9. In the conventional technology, the end tang 47 is connected rigidly to rocking arm 19, for which spring 48 is interposed with a predetermined fixed pretension between body 9 and rocking arm 19. In the present invention, on the other hand, spring 48 is still interposed between body 9 and rocking arm 19, but the tension of the spring can be adjusted by acting on a tangential adjusting worm gear 51 which is carried by a boss 52 that is integral with the structure of rocking arm 19 and engages with the toothed sector 43 of disk 40. Actuation of screw 51 causes a change in angular position of disk 40 relative to rocking arm 19 and hence a change in tension of spring 48 interposed between rocking arm 19 and the second body 9 of the derailleur, which tends to cause rocking arm 19 to rotate clockwise relative to body 9, referring to FIG. 1. According to the conventional technology, rocking arm 19 has a tab (not shown in the drawings) which interacts with body 9 to define the end of travel of the rocking arm with the derailleur removed.

It should be pointed out that a change in tension of spring 48 is not necessarily only reflected in a change of position of rocking arm 19, because as a result of the change in the system of forces to which the derailleur is subject, the latter generally assumes a new position and configuration, also corresponding to a rotation of the first body 8 about the axis of the first articulating pin 6. Therefore, with the device according to the invention it is possible to obtain, by adjusting the tension of the second spring 48, also a change in angular position of the first body 8 of the derailleur relative to the bicycle frame, in the assembled condition with the chain of the derailleur on the frame.

FIG. 9 shows a variant of the means of adjustment, in which wheel 39 is provided with a tab 39a which is subject to the action of an adjusting screw 53 carried in a tubular extension 54 of the structure of rocking arm 19.

It is clear from the foregoing description that the derailleur according to the invention enables the user to adjust the derailleur quickly and efficiently, with means that have a very simple structure and have smaller overall dimensions.

Again referring to FIGS. 7 and 8, the flat disk of sheet metal 40 has an edge bent through 90° 40a extending for more than 180°, whose end surfaces 40b, 40c interact with the end surfaces 52a, 52b of boss 52 (see FIG. 6) to define the stop positions of disk 40. FIG. 6 reveals how the device according to the invention makes it possible to obtain a wide angle of variation of the angular position of disk 40 with an adjusting screw that is not subject to displacements in the direction of its axis during adjustment and so does not take up space or have projections in any operating condition.

Of course, without prejudice to the principle of the invention, the design details and the forms of actuation can vary widely relative to what has been described and illustrated purely as an example.

What is claimed is:

1. Rear derailleur for a bicycle, intended for controlling the selective engagement of a bicycle chain on a series of coaxial pinions associated with the rear wheel of the bicycle, the said derailleur comprising:

a first articulating pin intended to be fixed to the bicycle frame with its axis substantially parallel to the axis of pinions, a first body mounted rotatable on the said first articulating pin, first elastic means associated with the said first body tending to rotate the latter about the said first pin relative to the bicycle frame, with reference to the assembled condition of the derailleur on the frame, to a stop position, a second body connected to the first body in such a way that it is movable relative to the first body at least in the direction parallel to axis of pinions, the position of the said second body being controlled by the operating means of the derailleur, a second articulating pin carried by the aforesaid second body and substantially parallel to the said first pin, a rocking arm carrying wheels for transmission of chain, mounted rotatable on the aforesaid second pin, and second elastic means interposed operatively between the aforesaid second body and the rocking arm, tending to rotate the latter about the said second pin to a stop position, in such a way that, with the derailleur fitted to the bicycle, with a chain of the bicycle in engagement on said rocking arm, the derailleur assumes a configuration that depends on the equilibrium between the forces to which it is subjected, i.e. mainly the reaction of chain on said rocking arm, the tension of the first elastic means and the tension of the second elastic means, wherein means are provided for quick adjustment of only the second elastic means, whereas the aforesaid first elastic means are without means for quick adjustment, wherein the second elastic means are comprised of a spring, fitted round the said second pin and with one end connected rigidly to said second body and the opposite end connected rigidly to an adjusting device carried by the said rocking arm, and wherein said means for quick adjustment of the second elastic means include means for adjusting the angular position of said adjusting device relative to said rocking arm about the axis of the second pin.

2. Derailleur according to claim 1, wherein the said adjusting device comprises a disk mounted rotatable on rocking arm about the axis of the said second pin and equipped with a toothed sector in engagement with a tangential adjusting worm gear mounted rotatable in the structure of rocking arm.

3. Derailleur according to claim 1, wherein the said adjusting device comprises a disk mounted rotatable on rocking arm about the axis of the said second pin and equipped with a tab interacting with the end of an adjusting screw screwed into a tubular extension of the body of rocking arm.

* * * * *